T. E. MURRAY & A. V. A. McHARG.
MULTIDUCT.
APPLICATION FILED APR. 30, 1913.

1,087,969.

Patented Feb. 24, 1914.

Witnesses:
Gertrude T. Webster
May T. McLarry.

Inventors
Thomas E. Murray
Archer V. A. McHarg
By their Attorney

UNITED STATES PATENT OFFICE.

THOMAS E. MURRAY AND ARTHUR V. A. McHARG, OF NEW YORK, N. Y.; SAID McHARG ASSIGNOR TO SAID MURRAY.

MULTIDUCT.

1,087,969.  Specification of Letters Patent.  Patented Feb. 24, 1914.

Application filed April 30, 1913. Serial No. 764,532.

*To all whom it may concern:*

Be it known that we, THOMAS E. MURRAY and ARTHUR V. A. McHARG, citizens of the United States, residing at New York, in the county of New York and State of New York, have invented a certain new and useful Improvement in Multiducts, of which the following is a specification.

The invention is a multiduct for electrical conductors. Hitherto said ducts have been pipes or conduits, each connected separately to the panel box or other center of distribution, each cut, fitted and installed separately, and, where needed, each bent or curved separately.

Our present invention provides a multiduct in which the conduits are produced in groups of any desired number from plates of sheet metal rolled or stamped to form longitudinal crenelations of truncated wedge shape in cross section. The plates are assembled one upon the other, so that the projections on each plate enter and make a wedging fit in the channels of the plate next below, thus producing a series of conduits for the reception of the line conductors. In order to connect the several sections of the multiduct end to end, plates conforming in shape to the crenelations of the top plates are applied to the same and secured by doubling their edges over the edges of said top plates. In this way we are enabled to make the multiduct very cheaply and solely of sheet metal and entirely free from all boxes, casings or coverings of insulating material. When thus made of sheet metal, the multiduct can be practically treated as a single duct in connecting it to other ducts.

Figure 1:
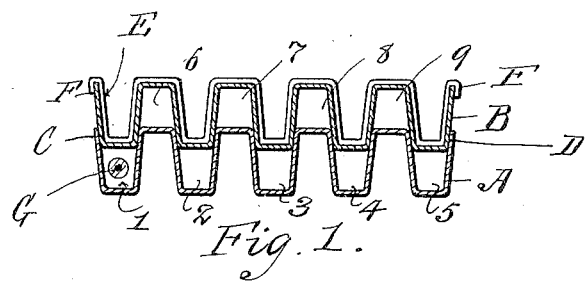
Figure 2:
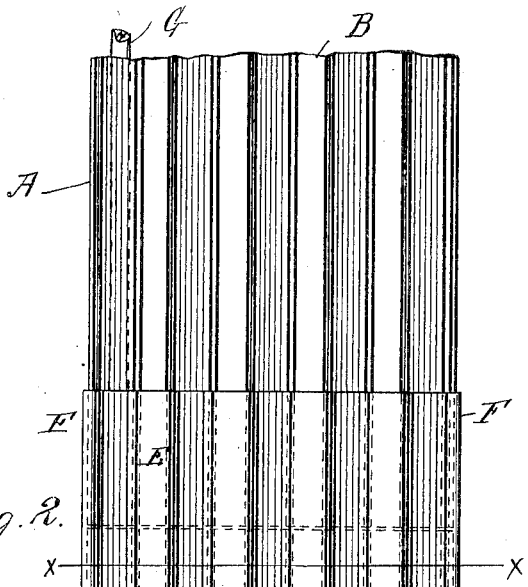

In the accompanying drawings Figure 1 is a section on line $x, x$ of Fig. 2. Fig. 2 is a top view.

Similar letters and numbers of reference indicate like parts.

A is an elongated plate of sheet metal of crenelated shape in cross section and having its channels 1, 2, 3, 4, 5 of truncated wedge shape in cross section. B is a second and similar plate, seated in plate A so that the plate B closes the channels 1, 2, 3, 4, 5 of plate A, while plate A in turn closes the channels 6, 7, 8, 9 of plate B. The plates A and B may be welded or soldered together at any desired points, as at C and D. Said plates are made of convenient lengths to form sections which may be united together end to end by a strap E which extends over the joint between the adjacent plates B, B, as shown in Fig. 2, and is welded or otherwise secured at its bent over edges F to said plates.

With two plates crenelated, as here shown, we obtain nine compartments or conduits, in each of which an electrical conductor, as G, may be placed. To increase the number of conduits, the number of crenelations in each plate may be increased, or the number of superposed plates may be augmented, as desired.

This multiduct may be very cheaply made, and, as here shown, may consist of but two crenelated plates of sheet metal, thus weighing little and occupying small space.

We claim:

1. A multiduct, consisting of two plates of sheet metal formed in longitudinal crenelations of truncated wedge shape in cross section, the projections on one of said plates entering and closing the channels in the other plate.

2. A multiduct formed of a plurality of successive sections, each section consisting of two plates of sheet metal formed in longitudinal crenelations of truncated wedge shape in cross section, the projections on one of said plates entering and closing the channels in the other plate, and a plate conforming in shape to said crenelations seated therein and covering the joint between and secured to said sections.

In testimony whereof we have affixed our signatures in presence of two witnesses.

THOMAS E. MURRAY.
ARTHUR V. A. McHARG.

Witnesses:
GERTRUDE P. PORTER,
MAY T. McGARRY.

Copies of this patent may be obtained for five cents each, by addressing the "Commissioner of Patents, Washington, D. C."